US009820193B2

(12) United States Patent
Patel et al.

(10) Patent No.: US 9,820,193 B2
(45) Date of Patent: Nov. 14, 2017

(54) DETERMINING A USER EQUIPMENT CONTEXT FOR A RADIO RESOURCE CONTROL CONNECTION REESTABLISHMENT REQUEST

(71) Applicant: Verizon Patent and Licensing Inc., Arlington, VA (US)

(72) Inventors: Nischal Patel, Schaumburg, IL (US); John Joseph Cooke, Schaumburg, IL (US); Catherine Gufen Ouyang, Southfield, MI (US); Shuang Echo Yang, Schaumburg, IL (US); David P. Wolff, Tustin, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 192 days.

(21) Appl. No.: 14/703,212

(22) Filed: May 4, 2015

(65) Prior Publication Data

US 2016/0330787 A1 Nov. 10, 2016

(51) Int. Cl.
*H04W 36/00* (2009.01)
*H04W 76/02* (2009.01)
*H04W 36/30* (2009.01)
*H04W 92/20* (2009.01)

(52) U.S. Cl.
CPC ... *H04W 36/0033* (2013.01); *H04W 36/0038* (2013.01); *H04W 36/0044* (2013.01); *H04W 36/0055* (2013.01); *H04W 36/30* (2013.01); *H04W 76/028* (2013.01); *H04W 92/20* (2013.01)

(58) Field of Classification Search
CPC ........ H04W 36/0033; H04W 36/0038; H04W 36/0044; H04W 36/0055; H04W 76/028; H04W 92/20; H04W 36/30
See application file for complete search history.

(56) References Cited

U.S. PATENT DOCUMENTS

| 2015/0036511 A1* | 2/2015 | Cheng | H04W 28/04 370/242 |
| 2016/0174282 A1* | 6/2016 | Grant | H04W 76/028 455/422.1 |

* cited by examiner

Primary Examiner — Kwang B Yao
Assistant Examiner — Moo Ryong Jeong (57) ABSTRACT

A device may receive a radio resource control (RRC) connection reestablishment request. The device may select one or more potential source base stations, from which to request a user equipment (UE) context associated with a user equipment, based on the RRC connection reestablishment request and an identification technique associated with locating the UE context. The device may request the UE context from the one or more potential source base stations. The device may obtain the UE context from a particular source base station, of the one or more potential source base stations, based on requesting the UE context. The device may establish an RRC connection with the user equipment using the UE context.

20 Claims, 10 Drawing Sheets

DETERMINING A USER EQUIPMENT CONTEXT FOR A RADIO RESOURCE CONTROL CONNECTION REESTABLISHMENT REQUEST

BACKGROUND

A user equipment (e.g., a mobile phone, a smart phone, or the like) may initiate a radio resource control (RRC) connection reestablishment based on a radio link failure, a handover failure, a mobility failure, an integrity check failure, an RRC connection reconfiguration failure, or the like. When a first base station receives an RRC connection reestablishment request from the user equipment, the first base station may request a user equipment context (UE context) from a second base station identified by a cell identifier (cell ID), such as a physical cell ID, included in the RRC connection reestablishment request.

DETAILED DESCRIPTION OF PREFERRED EMBODIMENTS

The following detailed description of example implementations refers to the accompanying drawings. The same reference numbers in different drawings may identify the same or similar elements.

A first base station may receive a request for reestablishment of a radio resource control (RRC) connection (e.g., via an RRC connection reestablishment request message) from a user equipment. The request may include a cell identifier (cell ID), such as a physical cell identifier (PCI) or the like, that identifies a second base station storing a user equipment (UE) context (e.g., a particular base station to which the user equipment was connected). The UE context may include information associated with maintaining connection services for the user equipment (e.g., during a handover from the second base station to the first base station), such as state information, security information, UE capability information, or the like. However, multiple neighboring base stations may be assigned the same cell ID. The first base station may transmit a request for the UE context to a third base station, identified by the cell ID, but the UE context may be stored by the second base station, also identified by the cell ID. In this case, the first base station may fail to receive the UE context and may reject the request relating to the RRC connection. Implementations, described herein, may facilitate a base station fulfilling a request for an RRC connection, even when multiple neighboring base stations are identified by the same cell ID.

Figure 1A:
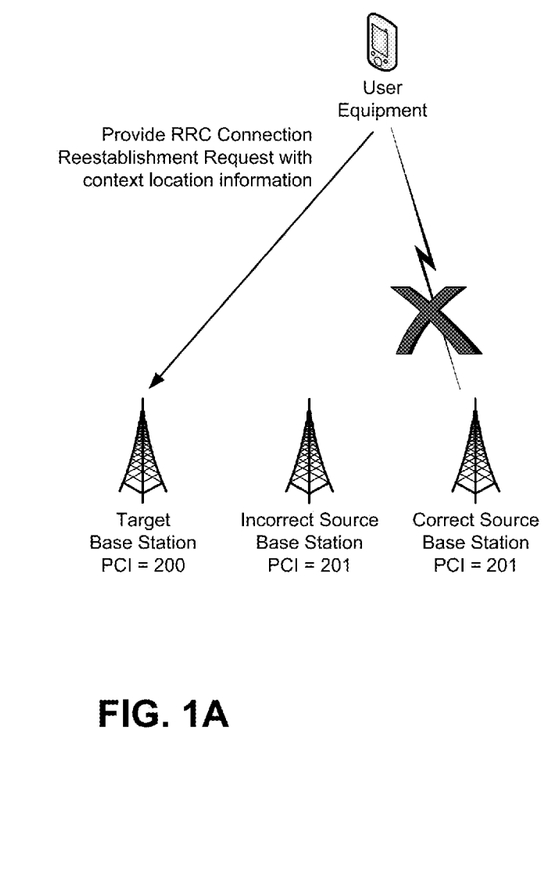
FIGS. 1A and 1B are diagrams of an overview of an example implementation described herein.
Figure 1B:
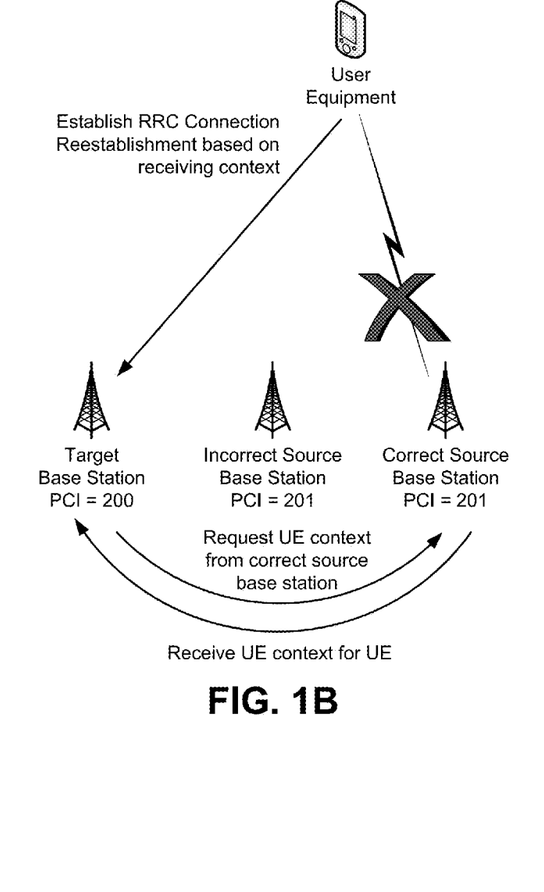

FIGS. 1A and 1B are diagrams of an overview of an example implementation 100 described herein. As shown in FIG. 1A, a first (target) base station may be associated with a first physical cell identifier (PCI), a second (incorrect source) base station may be associated with a second PCI, and a third (correct source) base station may be associated with the second PCI (e.g., the same PCI as the incorrect source base station). A base station may be termed a target base station when the base station is a recipient of a request for an RRC connection from a user equipment. A base station may be termed a correct source base station when the base station stores a UE context for the user equipment. A base station may be termed an incorrect source base station when the base station shares a PCI with the correct source base station but does not store the UE context for the user equipment. A base station may be termed a potential source base station if the base station is either a correct source base station or an incorrect source base station. Assume that the correct source base station and the incorrect source base station are neighbors (e.g., operate within a particular proximity) using different frequency bands to avoid interference. In another example, the correct source base station and the incorrect source base station may not be neighbors. For example, multiple base stations may be located in different areas, such as different areas within a particular proximity. Additionally, or alternatively, multiple base stations may be co-located. For example, the target base station, the incorrect source base station, and/or the correct source base station may be located at the same location.

With regard to FIG. 1A, assume that the user equipment (e.g., a mobile phone) is connected to the correct source base station, and the correct source base station stores a UE context associated with the user equipment. When the connection to the correct source base station is terminated, the user equipment may transmit, to the target base station, a request for establishment of an RRC connection (e.g., an RRC connection reestablishment request message). The request may include information identifying a location for the UE context associated with the user equipment. The target base station may select one or more potential source base stations from which the UE context is to be requested. For example, the target base station may select the correct source base station as one of the one or more potential source base stations.

Using a first technique, the target base station may receive an identifier (other than the PCI shared by the incorrect source base station and the correct source base station) via the request message that identifies the correct source base station, such as a global cell identifier (GCI). Using a second technique, the target base station may receive information associated with distinguishing between multiple potential source base stations sharing the second PCI, such as frequency information associated with identifying the correct source base station. Using a third technique, the target base station may identify a set of potential source base stations sharing the second PCI, and may request the UE context from each base station of the set of base stations.

Using a fourth technique, the target base station may obtain information indicating a quantity of RRC connection requests associated with a set of potential source base stations sharing the second PCI, and may select the correct source base station based on a corresponding quantity of RRC connection requests (e.g., based on the correct source base station being associated with more RRC connection requests than the incorrect source base station). In another example, with regard to the fourth technique, another connection metric may be utilized, such as an RRC connection metric (e.g., a quantity of RRC connection setup attempts, successes, failures, etc.), an RRC reestablishment metric (e.g., a quantity of RRC connection reestablishment attempts, successes, failures, etc.), a handover metric (e.g., a quantity of handover successes, attempts, failures, etc.), or the like.

Using a fifth technique, when the target base station determines that the UE is associated with a particular mobility level, the UE may identify a quantity of base stations previously visited by the UE (e.g., the last 5 visited base stations, the last 10 visited base stations, all visited base stations during the previous 5 minutes, etc.) as a set of potential source base stations and request the UE context from the set of potential source base stations.

As shown in FIG. 1B, based on selecting the correct source base station, the target base station may request the UE context from the correct source base station. The target base station may receive the UE context from the correct source base station based on requesting the UE context. The target base station may establish the RRC connection with the user equipment based on receiving the UE context.

In this way, a target base station may transmit a request for a UE context to one or more potential source base stations, at least one of which is a correct source base station that stores the UE context, and may establish an RRC connection for a user equipment based on receiving the UE context.

Figure 2:
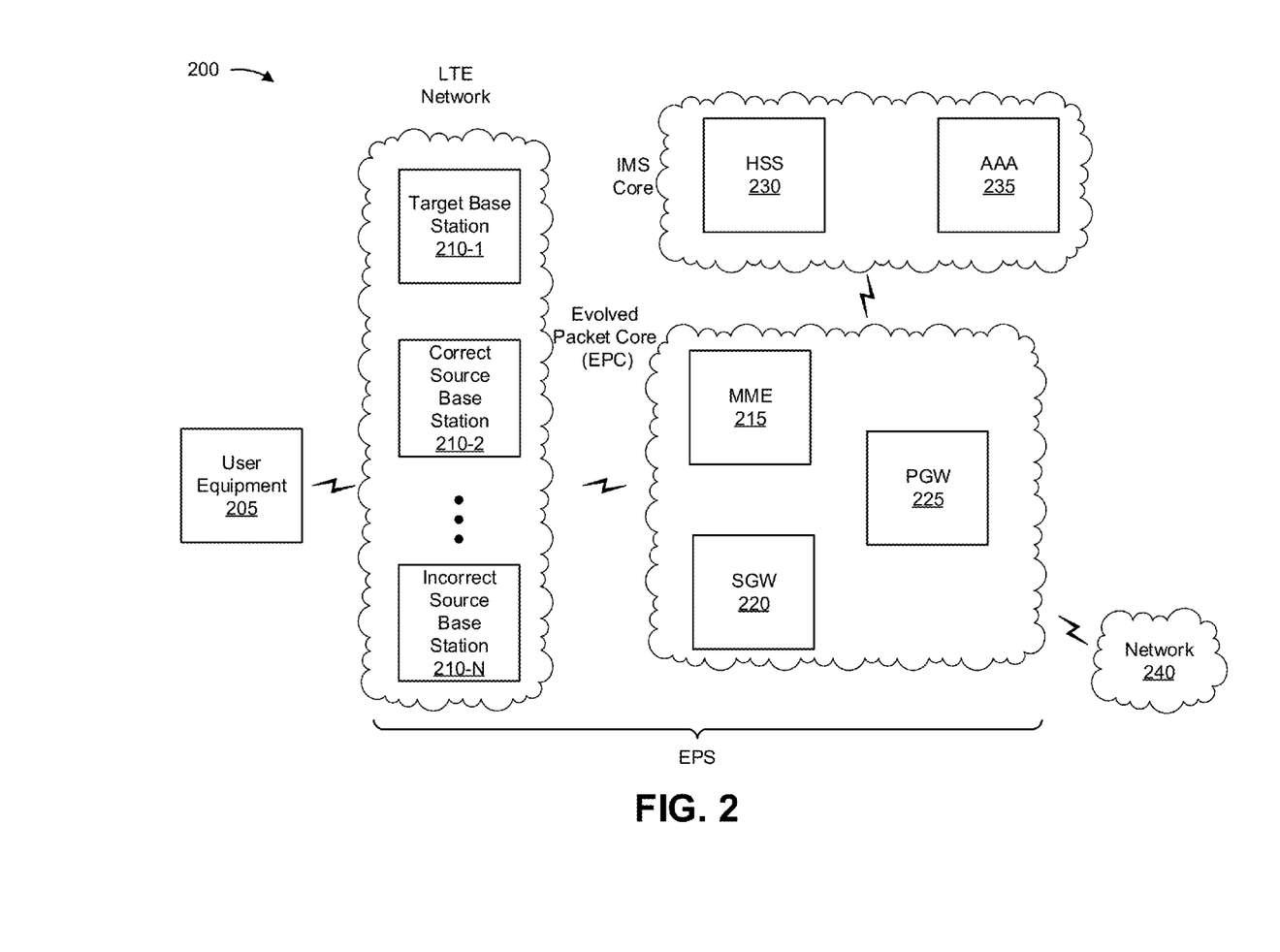
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a user equipment 205; one or more base stations 210-1 through 210-N (N≥1) (hereinafter referred to collectively as "base stations 210," and individually as "base station 210"); a mobility management entity device (MME) 215; a serving gateway (SGW) 220; a packet data network gateway (PGW) 225; a home subscriber server (HSS) 230; an authentication, authorization, and accounting server (AAA) 235; and a network 240. Devices of environment 200 may interconnect via wired connections, wireless connections, or a combination of wired and wireless connections.

Some implementations are described herein as being performed within a long term evolution (LTE) network for explanatory purposes. Some implementations may be performed within a network that is not an LTE network, such as a third generation (3G) network, a code division multiple access (CDMA) network, or the like.

Environment 200 may include an evolved packet system (EPS) that includes an LTE network and/or an evolved packet core (EPC) that operate based on a third generation partnership project (3GPP) wireless communication standard. The LTE network may include a radio access network (RAN) that includes one or more base stations 210 that take the form of evolved Node Bs (eNBs) via which user equipment 205 communicates with the EPC. The EPC may include MME 215, SGW 220, and/or PGW 225 that enable user equipment 205 to communicate with network 240 and/or an Internet protocol (IP) multimedia subsystem (IMS) core. The IMS core may include HSS 230 and/or AAA 235, and may manage device registration and authentication, session initiation, or the like, associated with user equipment 205. HSS 230 and/or AAA 235 may reside in the EPC and/or the IMS core.

User equipment 205 may include one or more devices capable of communicating with base station 210 and/or a network (e.g., network 240). For example, user equipment 205 may include a wireless communication device, a radiotelephone, a personal communications system (PCS) terminal (e.g., that may combine a cellular radiotelephone with data processing and data communications capabilities), a smart phone, a laptop computer, a tablet computer, a personal gaming system, and/or a similar device. User equipment 205 may send traffic to and/or receive traffic from network 240 (e.g., via base station 210, SGW 220, and/or PGW 225). In some implementations, user equipment 205 may include, in an RRC reestablishment request, information identifying a particular base station 210 that stores a UE context for user equipment 205 (e.g., correct source base station 210), such as an identifier, frequency information, bandwidth information, or the like.

Base station 210 (e.g., target base station 210-1, correct source base station 210-2, incorrect source base station 210-N, or the like) may include one or more devices capable of transferring traffic, such as audio, video, text, and/or other traffic, destined for and/or received from user equipment 205. In some implementations, base station 210 may include an eNB associated with the LTE network that receives traffic from and/or sends traffic to network 240 via SGW 220 and/or PGW 225. Additionally, or alternatively, one or more base stations 210 may be associated with a RAN that is not associated with the LTE network. Base station 210 may send traffic to and/or receive traffic from user equipment 205 via an air interface. In some implementations, base station 210 may include a small cell base station, such as a base station of a microcell, a picocell, and/or a femtocell. A particular base station 210 may be termed a target base station 210 when the particular base station 210 receives an RRC connection reestablishment request, a potential source base station 210 when the particular base station 210 shares a common identifier with one or more other base stations 210 that store a UE context, a correct source base station 210 when the particular base station 210 stores the UE context, and/or an incorrect source base station 210 when the particular base station 210 does not store the UE context.

MME 215 may include one or more devices, such as one or more server devices, capable of managing authentication, activation, deactivation, and/or mobility functions associated with user equipment 205. In some implementations, MME 215 may perform operations relating to authentication of user equipment 205. Additionally, or alternatively, MME 215 may facilitate the selection of a particular SGW 220 and/or a particular PGW 225 to serve traffic to and/or from user equipment 205. MME 215 may perform operations associated with handing off user equipment 205 from a first base station 210 (e.g., correct source base station 210) to a second base station 210 (e.g., target base station 210) when user equipment 205 is transitioning from a first cell associated with the first base station 210 to a second cell associated with the second base station 210. Additionally, or alternatively, MME 215 may select another MME (not pictured), to which user equipment 205 should be handed off (e.g., when user equipment 205 moves out of range of MME 215).

SGW 220 may include one or more devices capable of routing packets. For example, SGW 220 may include one or more data processing and/or traffic transfer devices, such as a gateway, a router, a modem, a switch, a firewall, a network interface card (NIC), a hub, a bridge, a server device, an optical add/drop multiplexer (OADM), or any other type of device that processes and/or transfers traffic. In some implementations, SGW 220 may aggregate traffic received from one or more base stations 210 associated with the LTE network, and may send the aggregated traffic to network 240 (e.g., via PGW 225) and/or other network devices associated with the EPC and/or the IMS core. SGW 220 may also receive traffic from network 240 and/or other network devices, and may send the received traffic to user equipment 205 via base station 210. Additionally, or alternatively, SGW 220 may perform operations associated with handing off user equipment 205 to and/or from an LTE network.

PGW 225 may include one or more devices capable of providing connectivity for user equipment 205 to external packet data networks (e.g., other than the depicted EPC and/or LTE network). For example, PGW 225 may include one or more data processing and/or traffic transfer devices, such as a gateway, a router, a modem, a switch, a firewall, a NIC, a hub, a bridge, a server device, an OADM, or any other type of device that processes and/or transfers traffic. In some implementations, PGW 225 may aggregate traffic received from one or more SGWs 220, and may send the aggregated traffic to network 240. Additionally, or alternatively, PGW 225 may receive traffic from network 240, and may send the traffic to user equipment 205 via SGW 220 and base station 210. PGW 225 may record data usage information (e.g., byte usage), and may provide the data usage information to AAA 235.

HSS 230 may include one or more devices, such as one or more server devices, capable of managing (e.g., receiving, generating, storing, processing, and/or providing) information associated with user equipment 205. For example, HSS 230 may manage subscription information associated with user equipment 205, such as information that identifies a subscriber profile of a user associated with user equipment 205, information that identifies services and/or applications that are accessible to user equipment 205, location information associated with user equipment 205, a network identifier (e.g., a network address) that identifies user equipment 205, information that identifies a treatment of user equipment 205 (e.g., quality of service information, a quantity of minutes allowed per time period, a quantity of data consumption allowed per time period, etc.), and/or similar information. HSS 230 may provide this information to one or more other devices of environment 200 to support the operations performed by those devices.

AAA 235 may include one or more devices, such as one or more server devices, that perform authentication, authorization, and/or accounting operations for communication sessions associated with user equipment 205. For example, AAA 235 may perform authentication operations for user equipment 205 and/or a user of user equipment 205 (e.g., using one or more credentials), may control access, by user equipment 205, to a service and/or an application (e.g., based on one or more restrictions, such as time-of-day restrictions, location restrictions, single or multiple access restrictions, read/write restrictions, etc.), may track resources consumed by user equipment 205 (e.g., a quantity of voice minutes consumed, a quantity of data consumed, etc.), and/or may perform similar operations.

Network 240 may include one or more wired and/or wireless networks. For example, network 240 may include a cellular network (e.g., an LTE network, a 3G network, a code division multiple access (CDMA) network, etc.), a public land mobile network (PLMN), a wireless local area network (e.g., a Wi-Fi network), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
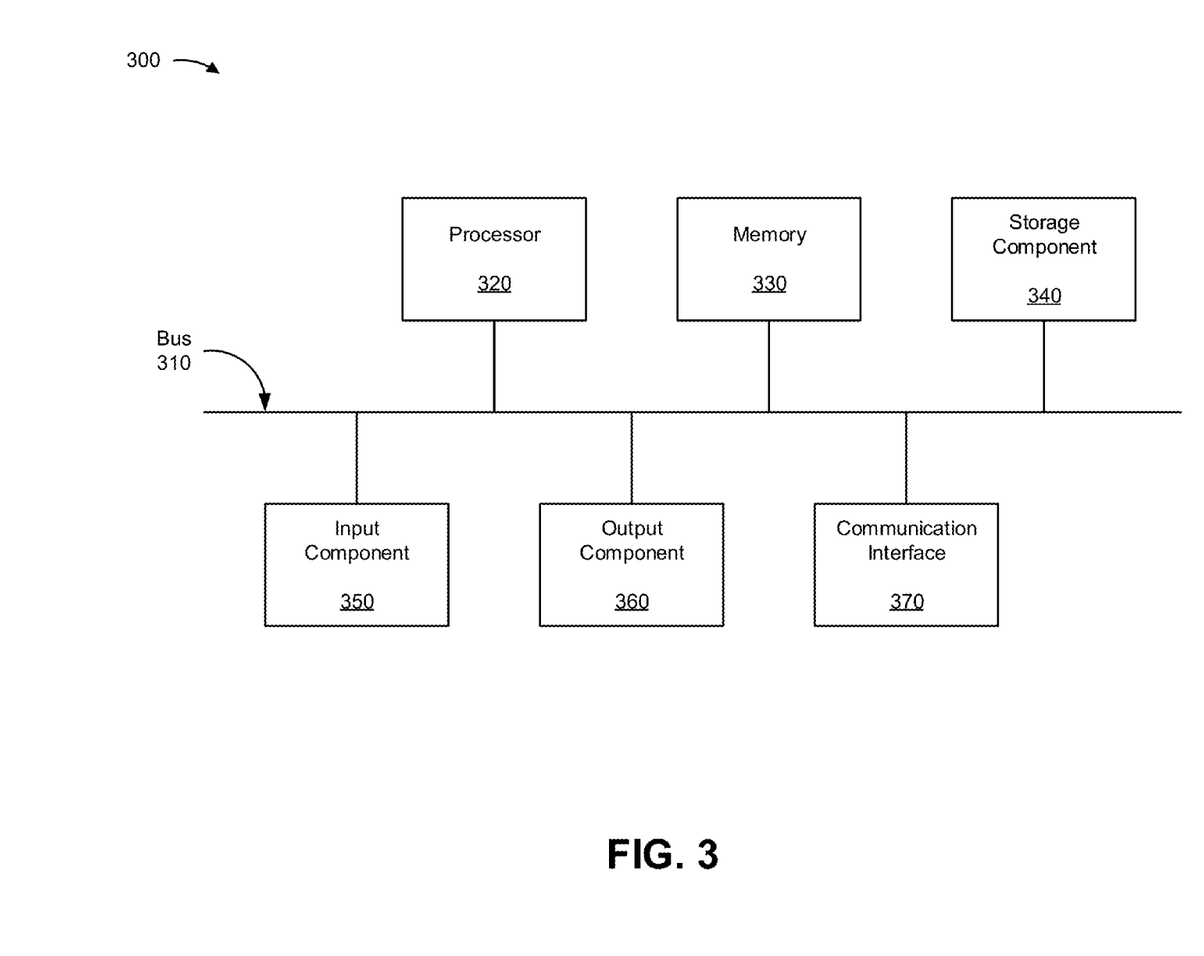
FIG. 3 is a diagram of example components of one or more devices of FIG. 2.

FIG. 3 is a diagram of example components of a device 300. Device 300 may correspond to user equipment 205, base station 210, MME 215, SGW 220, PGW 225, HSS 230, and/or AAA 235. In some implementations, user equipment 205, base station 210, MME 215, SGW 220, PGW 225, HSS 230, and/or AAA 235 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 may include a component that permits communication among the components of device 300. Processor 320 is implemented in hardware, firmware, or a combination of hardware and software. Processor 320 may include a processor (e.g., a central processing unit (CPU), a graphics processing unit (GPU), an accelerated processing unit (APU), etc.), a microprocessor, and/or any processing component (e.g., a field-programmable gate array (FPGA), an application-specific integrated circuit (ASIC), etc.) that interprets and/or executes instructions. Memory 330 may include a random access memory (RAM), a read only memory (ROM), and/or another type of dynamic or static storage device (e.g., a flash memory, a magnetic memory, an optical memory, etc.) that stores information and/or instructions for use by processor 320.

Storage component 340 may store information and/or software related to the operation and use of device 300. For example, storage component 340 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 350 may include a component that permits device 300 to receive information, such as via user input (e.g., a touch screen display, a keyboard, a keypad, a mouse, a button, a switch, a microphone, etc.). Additionally, or alternatively, input component 350 may include a sensor for sensing information (e.g., a global positioning system (GPS) component, an accelerometer, a gyroscope, an actuator, etc.). Output component 360 may include a component that provides output information from device 300 (e.g., a display, a speaker, one or more light-emitting diodes (LEDs), etc.).

Communication interface 370 may include a transceiver-like component (e.g., a transceiver, a separate receiver and transmitter, etc.) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
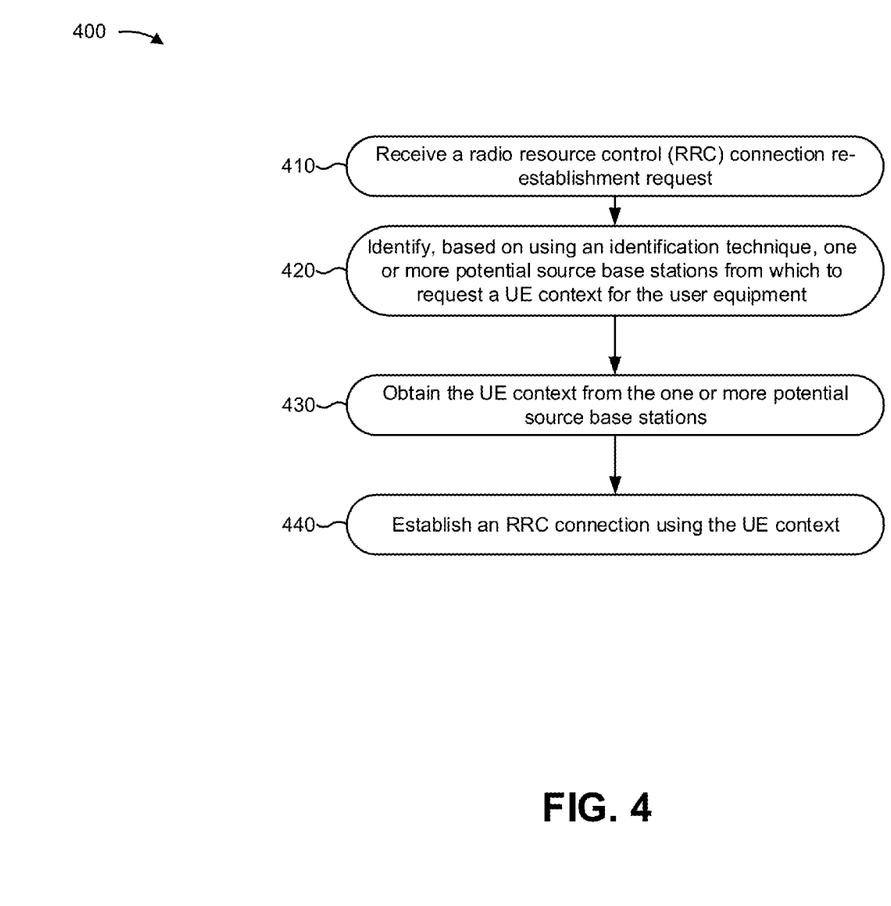
FIG. 4 is a flow chart of an example process for determining a user equipment context when multiple base stations share a common physical cell identifier.

FIG. 4 is a flow chart of an example process 400 for determining a user equipment context when multiple base stations share a common physical cell identifier. In some implementations, one or more process blocks of FIG. 4 may be performed by base station 210. Additionally, or Alternatively, one or more process blocks of FIG. 4 may be performed by another device or a set of devices separate from or including base station 210 (e.g., target base station 210-1), such as user equipment 205, base station 210 (e.g., correct source base station 210-2 and/or incorrect source base station 210-N), MME 215, SGW 220, PGW 225, HSS 230, and/or AAA 235.

As shown in FIG. 4, process 400 may include receiving a radio resource control (RRC) connection reestablishment request (block 410). For example, base station 210 (e.g., target base station 210) may receive the RRC connection reestablishment request (e.g., an RRC connection reestablishment request message) from user equipment 205. In some implementations, target base station 210 may receive a physical cell identifier (PCI) included with the RRC reestablishment request. For example, target base station 210 may parse an RRC reestablishment request message to determine the PCI.

The PCI may be intended to identify a particular base station 210 to which user equipment 205 was connected prior to sending the RRC connection reestablishment request and which stores a UE context for user equipment 205. However, multiple base stations 210 may be identified by the same PCI. A set of base stations 210 that are identified by the same PCI included in the RRC reestablishment request message may be termed a set of potential source base stations 210. A first base station 210, of the set of potential source base stations 210, that was intended to be identified (e.g., to which user equipment 205 was connected and which stores the UE context) may be termed a correct source base station 210. One or more second base stations 210, of the set of potential source base stations 210, that were not intended to be identified may each be termed an incorrect source base station 210.

As further shown in FIG. 4, process 400 may include identifying, based on using an identification technique, one or more potential source base stations from which to request a UE context for the user equipment (block 420). For example, base station 210 (e.g., target base station 210) may identify the one or more potential source base stations 210, from which to request the UE context, using an identification technique.

In some implementations, target base station 210 may select a particular potential source base station 210 based on receiving another identifier for the potential source base station 210. For example, although multiple potential source base stations 210 may be identified by the same PCI, target base station 210 may receive another identifier that identifies a correct source base station 210, such as a global cell identifier (GCI), a frequency identifier and/or a bandwidth identifier (e.g., an identifier of a frequency and/or a bandwidth at which correct source base station 210 operates, which in combination with the PCI may uniquely identify correct source base station 210), or the like. In some implementations, the other identifier may be a unique identifier (e.g., the identifier may identify only correct source base station 210), such as a GCI or the like. Additionally, or alternatively, the other identifier may be a semi-unique identifier (e.g., the identifier, when combined with other information, may identify only correct source base station 210), such as bandwidth information, frequency information, or the like.

In some implementations, target base station 210 may receive another identifier associated with managing multiple hops associated with user equipment 205 prior to the RRC connection reestablishment request (e.g., base stations 210 that user equipment 205 connected to). For example, target base station 210 may receive a list of base stations 210, visited by user equipment 205, in the request (e.g., that includes a cell radio network temporary identifier, a short media access control (MAC) identifier (shortMAC-i), a period of time during which the multiple hops were performed, or the like). In this case, target base station 210 may use the information associated with managing the multiple hops to identify one or more correct source base stations 210 that store a UE context for user equipment 205.

In some implementations, target base station 210 may obtain the other identifier identifying correct source base station 210 (e.g., a GCI) from user equipment 205, such as by requesting and receiving the other identifier. Additionally, or alternatively, the other identifier may be included with other information associated with identifying the correct source base station 210, such as in a "ReestabUE-Identity" portion of an RRC connection reestablishment request. In some implementations, target base station 210 may determine that the other identifier identifies a subset of the set of potential source base stations 210. For example, target base station 210 may filter the set of potential source base stations 210 based on a bandwidth identifier to generate a filtered set of potential source base stations 210, and may request the UE context from the filtered set of potential source base stations 210. In another example, target base station 210 may filter the set of potential source base stations 210 based on another criterion related to an operating tendency or frequency of a particular base station 210, not related to the operating tendency or frequency of the particular base station 210, or the like.

In some implementations, target base station 210 may select multiple potential source base stations 210, of a set of potential source base stations 210, from which to request the UE context. For example, target base station 210 may identify the multiple potential source base stations 210 that are identified by the PCI, and may request the UE context from the multiple potential source base stations 210. In some implementations, target base station 210 may select the set of potential source base stations 210, a subset of the set of potential source base stations 210, or the like.

In some implementations, target base station 210 may select one or more potential source base stations 210, from which to request the UE context, based on a connection metric, such as a quantity of RRC connection reestablishment requests determined to be associated, respectively, with the one or more potential source base stations 210. For example, target base station 210 may determine, for each potential source base station 210 of the set of potential source base stations 210, a quantity of RRC connection reestablishment requests that have been associated with the potential source base station 210, and target base station 210 may select one or more potential source base stations 210 that are associated with a threshold quantity of RRC connection reestablishment requests. A threshold quantity of RRC connection reestablishment requests may indicate that the potential source base station 210 is associated with a failure, and may be a reason for user equipment 205 transmitting the RRC connection reestablishment request received by target base station 210.

Additionally, or alternatively, target base station 210 may select a particular potential source base station 210, of the set of potential source base stations 210, that is associated with a particular connection metric, such as the greatest quantity of RRC connection reestablishment requests, the fewest quantity of RRC connection reestablishment requests, or some other connection metric. Additionally, or alternatively, target base station 210 may select a particular base station 210 that is not identified by a PCI in the RRC connection reestablishment request based on the particular base station 210 being associated with a threshold quantity of RRC connection reestablishment requests. In this way, target base station 210 may attempt to identify correct source base station 210 even when the RRC connection reestablishment request fails to include a PCI, includes an incorrect PCI, or the like.

In some implementations, target base station 210 may select one or more potential source base stations 210 based on a mobility level (e.g., a mobility level described in the Third Generation Partnership Project (3GPP) TS 36.304) of user equipment 205. For example, when user equipment 205 is associated with a particular mobility level corresponding to a particular mobility level of the 3GPP specification, such as a high mobility level, a medium mobility level, or the like, target base station 210 may determine a set of base stations 210 previously visited by user equipment 205 (e.g., the last 5 base stations 210, the last 10 base stations 210, etc.) and may select from the set of base stations 210. In some implementations, target base station 210 may request information identifying the set of base stations 210 previously visited by user equipment 205. For example, target base station 210 may request information identifying a set of previously visited base stations 210, such as a set of PCIs, a set of radio network temporary identifiers, a set of short-MAC-is, a set of GCIs, or the like.

In some implementations, target base station 210 may select an identification technique to utilize based on a type of connection. For example, for a voice over LTE (VoLTE) type of connection with an associated quality of service (QoS) class identifier (QCI), target base station 210 may select an identification technique that facilitates requesting the UE context from multiple potential source base stations 210. Additionally, or alternatively, for a best effort traffic type of connection with an associated QCI, target base station 210 may select an identification technique that facilitates requesting the UE context from a single potential source base station 210.

In some implementations, target base station 210 may select an identification technique to utilize in selecting the one or more potential source base stations 210 based on an effectiveness metric. For example, target base station 210 may determine a success rate for requesting a UE context (e.g., a metric measuring requests for a UE context in which the UE context was returned against requests for a UE context in which the UE context was not returned) using one or more of the identification techniques, and may select a particular identification technique based on the success rate. Additionally, or alternatively, target base station 210 may select the identification technique based on information received from user equipment 205. For example, when user equipment 205 includes a GCI, target base station 210 may utilize the identification technique that utilizes the GCI to select the one or more potential source base stations 210. In some implementations, target base station 210 may select an identification technique based on a threshold value. For example, when requests for a UE context fail at a first threshold rate, target base station 210 may utilize a first identification technique and when requests for the UE context fail at a second threshold rate, target base station 210 may utilize a second identification technique.

In some implementations, target base station 210 may select multiple identification techniques. For example, target base station 210 may utilize both a frequency identifier and information regarding a quantity of RRC connection reestablishment requests to select the one or more potential source base stations 210. In some implementations, target base station 210 may perform multiple selections. For example, target base station 210 may utilize a first identification technique to select a first one or more potential source base stations 210 from which to request the UE context, and may, if the request fails, use a second identification technique to select a second one or more potential source base stations 210 from which to request the UE context. Additionally, or alternatively, target base station 210 may concurrently transmit requests for the UE context to the first one or more potential source base stations 210 and the second one or more potential source base stations 210.

As further shown in FIG. 4, process 400 may include obtaining the UE context from the one or more potential source base stations (block 430). For example, target base station 210 may request the UE context from the one or more potential source base stations 210 (e.g., via an X2 interface connection) and may receive the UE context from the correct source base station 210 of the one or more potential source base stations 210. In some implementations, target base station 210 may provide information identifying user equipment 205 to the one or more potential source base stations 210 when requesting the UE context, such as a device identifier or the like. In some implementations, target base station 210 may request the UE context from multiple sets of potential source base stations 210. For example, when target base station 210 identifies a first one or more potential source base stations 210 based on a first identification technique and a second one or more potential source base stations 210 based on a second identification technique, target base station 210 may request the UE context from the first one or more potential source base stations 210 and, if the UE context is not returned based on the request, may request the UE context from the second one or more potential source base stations 210.

As further shown in FIG. 4, process 400 may include establishing an RRC connection using the UE context (block 440). For example, target base station 210 may utilize the UE context to establish the RRC connection. In some implementations, target base station 210 may utilize the UE context to maintain LTE services. For example, target base station 210 may utilize information of the UE context to maintain LTE services to user equipment 205 during a handover to target base station 210 (e.g., from correct source base station 210).

Although FIG. 4 is described in terms of a 3GPP signaling implementation, FIG. 4 may also be utilized with one or more radio access technologies (RATs), such as a third generation (3G) RAT, a fourth generation (4G) RAT, a fifth generation (5G) RAT, or the like.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5A:
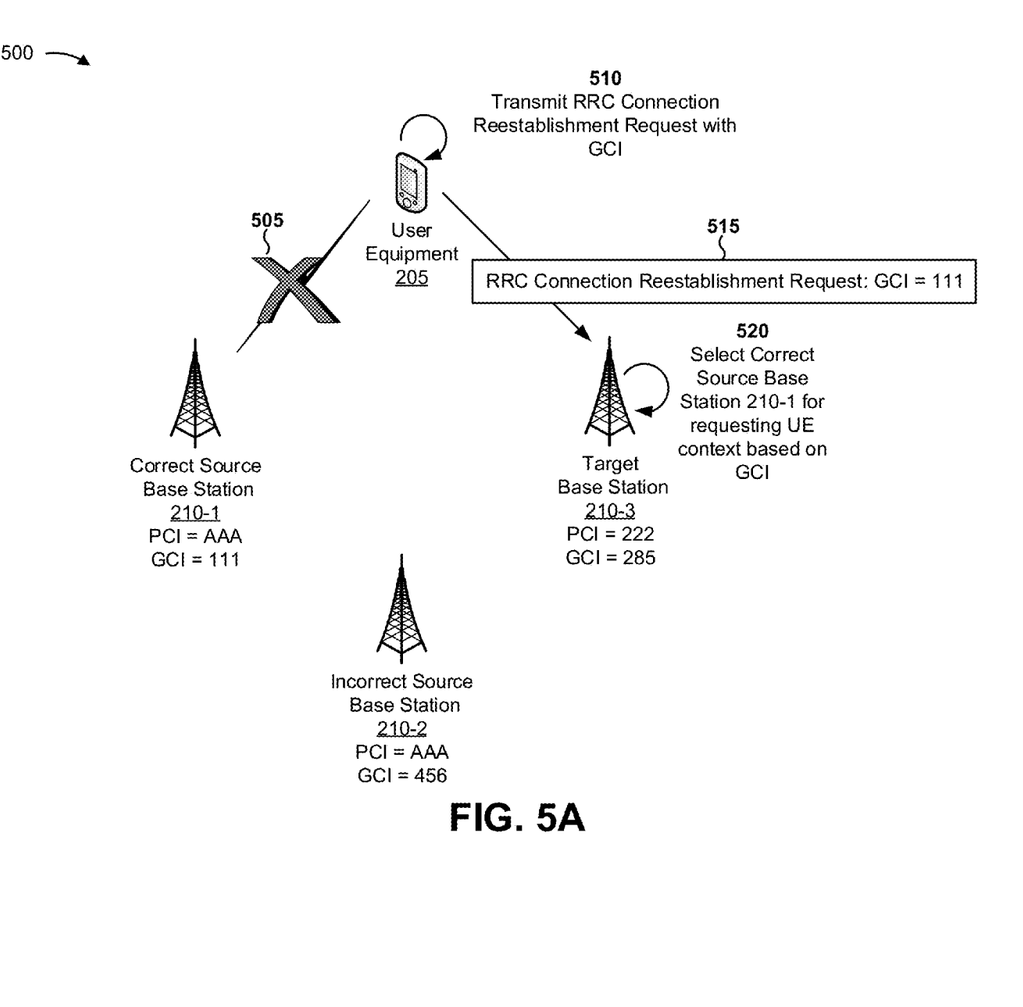
FIGS. 5A and 5B are diagrams of an example implementation relating to the example process shown in FIG. 4.
Figure 5B:
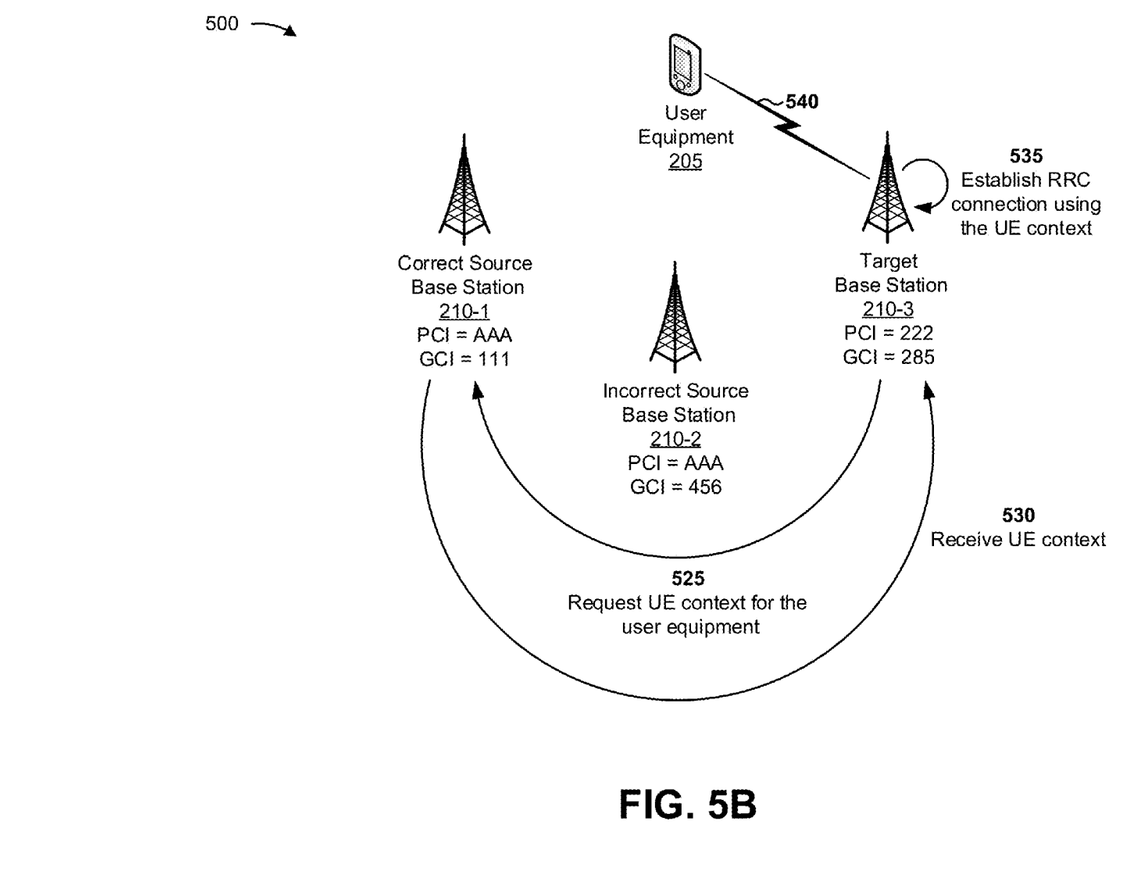

FIGS. 5A and 5B are diagrams of an example implementation 500 relating to example process 400 shown in FIG. 4. FIGS. 5A and 5B show an example of determining a user equipment context when multiple base stations share a common physical cell identifier.

As shown in FIG. 5A, and by reference number 505, a connection between user equipment 205 and correct source base station 210-1 is terminated. Correct source base station 210-1, incorrect source base station 210-2, and target base station 210-3 are base stations 210 within a proximity of user equipment 205. Correct source base station 210-1 and incorrect source base station 210-2 are associated with the same PCI, "AAA," but correct source base station 210-1 is identified by a first GCI, "111," and incorrect source base station 210-2 is identified by a second GCI, "456." As shown by reference number 510, user equipment 205 transmits RRC connection reestablishment request 515 which includes the first GCI identifying correct source base station 210-1. As shown by reference number 520, target base station 210-3 selects correct source base station 210-1 from which to request a UE context associated with user equipment 205 based on the first GCI. In another example, target base station 210-3 selects correct source base station 210-1 based on the first GCI and the PCI. In another example, target base station 210-3 may select correct source base station 210-1 based on frequency information or the like identifying correct source base station 210-1.

As shown in FIG. 5B, and by reference number 525, target base station 210-3 requests the UE context from correct source base station 210-1. As shown by reference number 530, target base station 210-3 receives the UE context from correct source base station 210-1. As shown by reference number 535, target base station 210-3 establishes an RRC connection 540 with user equipment 205, thereby fulfilling the RRC connection reestablishment request 515.

As indicated above, FIGS. 5A and 5B are provided merely as an example. Other examples are possible and may differ from what was described with regard to FIGS. 5A and 5B.

Figure 6A:
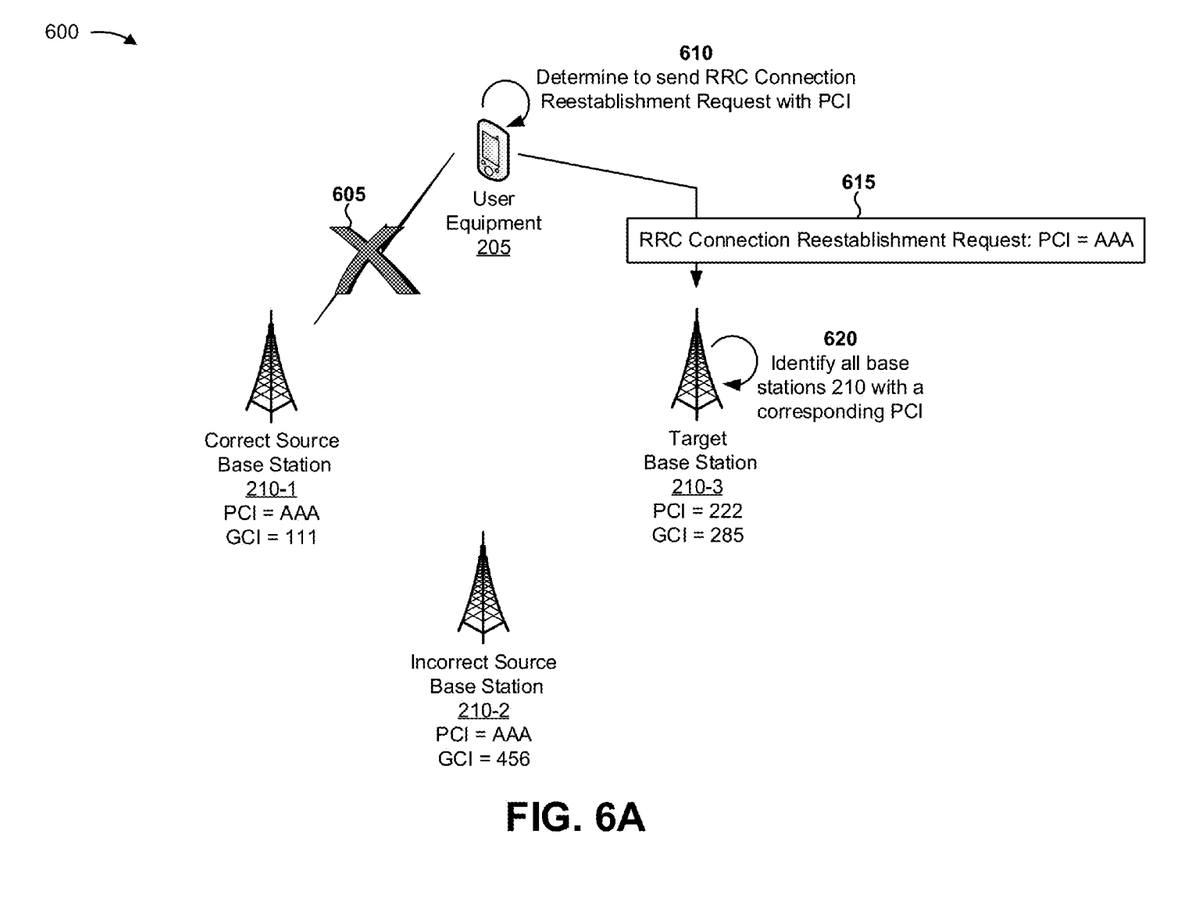
FIGS. 6A and 6B are diagrams of an example implementation relating to the example process shown in FIG. 4.
Figure 6B:
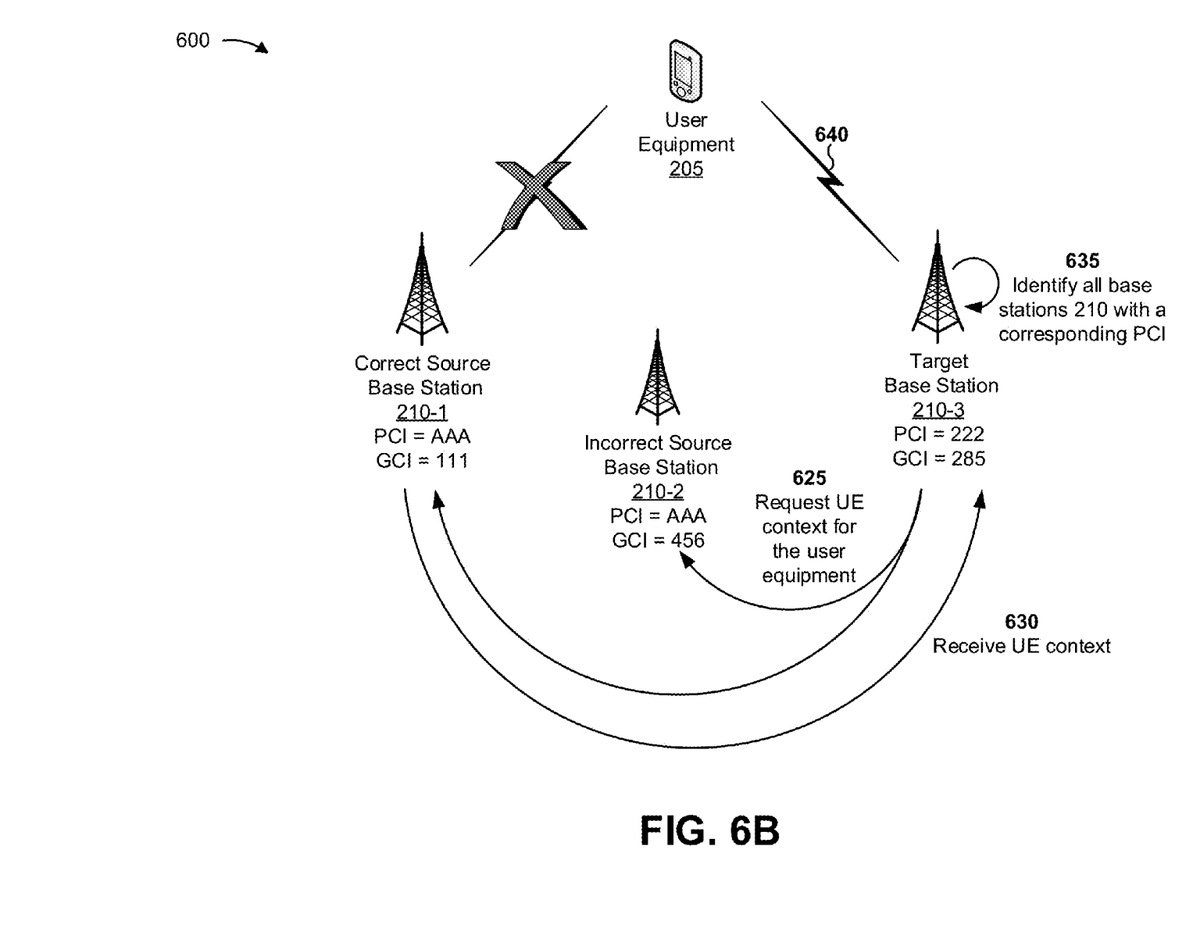

FIGS. 6A and 6B are diagrams of an example implementation 600 relating to example process 400 shown in FIG. 4. FIGS. 6A and 6B show an example of determining a user equipment context when multiple base stations share a common physical cell identifier.

As shown in FIG. 6A, and by reference number 605, a connection between user equipment 205 and correct source base station 210-1 is terminated. Correct source base station 210-1, incorrect source base station 210-2, and target base station 210-3 are base stations 210 within a proximity of user equipment 205. Correct source base station 210-1 and incorrect source base station 210-2 are associated with the same PCI, "AAA." As shown by reference number 610, target base station 210-3 receives, from user equipment 205, an RRC connection reestablishment request 615 that identifies the PCI, "AAA," common to both correct source base station 210-1 and incorrect source base station 210-2. As shown by reference number 620, target base station 210-3 identifies potential source base stations 210 that are associated with the PCI, such as correct source base station 210-1 and incorrect source base station 210-2.

As shown in FIG. 6B, and by reference number 625, target base station 210-3 requests a UE context from the potential source base stations 210 (e.g., correct source base station 210-1 and incorrect source base station 210-2). As shown by reference number 630, target base station 210-3 receives the UE context from correct source base station 210-1. Target base station 210-3 may receive a message from incorrect source base station 210-2 indicating that incorrect source base station 210-2 cannot provide the UE context, may fail to receive a response from incorrect source base station 210-2, or the like. As shown by reference number 635, target base station 210-3 establishes an RRC connection 640 with user equipment 205.

As indicated above, FIGS. 6A and 6B are provided merely as an example. Other examples are possible and may differ from what was described with regard to FIGS. 6A and 6B.

Figure 7A:
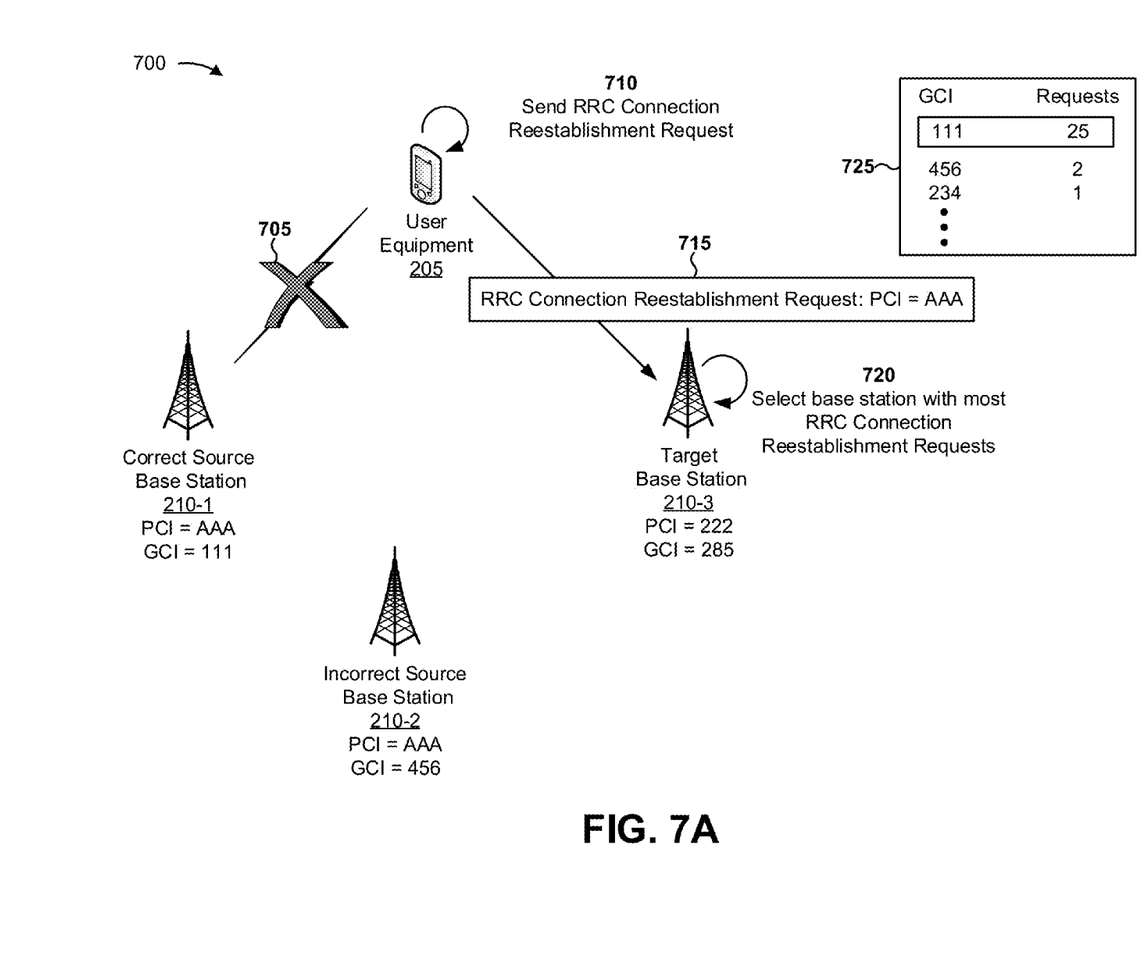
FIGS. 7A and 7B are diagrams of an example implementation relating to the example process shown in FIG. 4.
Figure 7B:
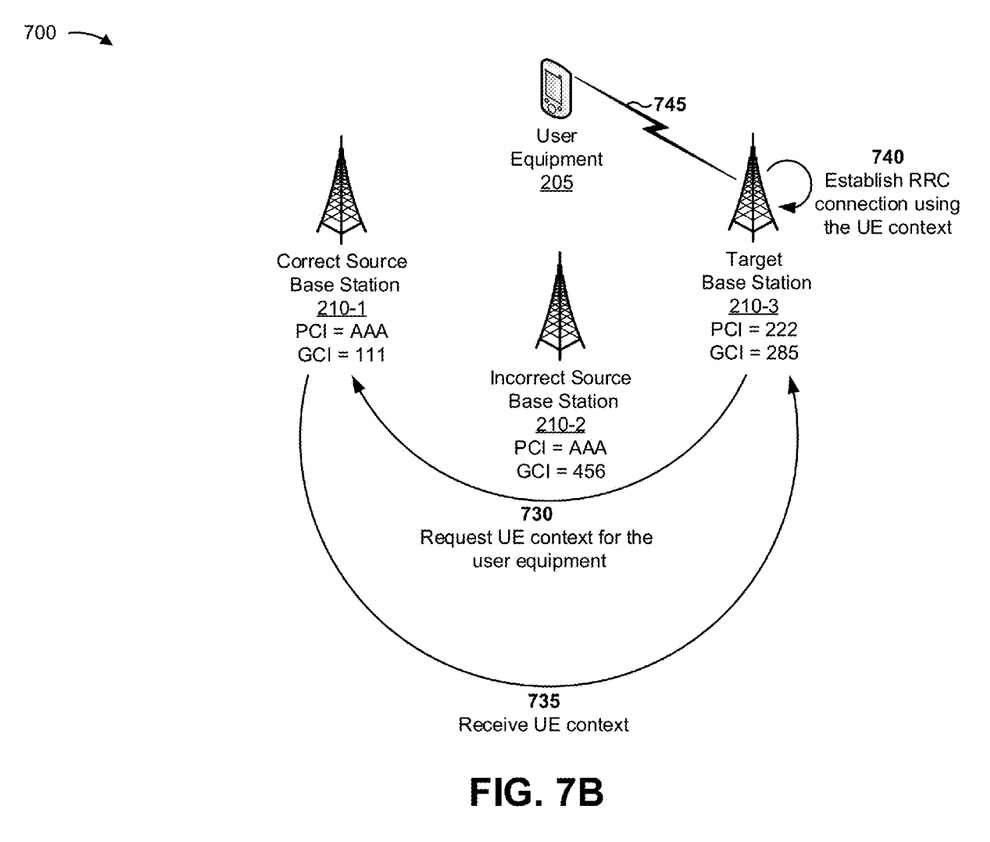

FIGS. 7A and 7B are diagrams of an example implementation 700 relating to example process 400 shown in FIG. 4. FIGS. 7A and 7B show an example of determining a user equipment context when multiple base stations share a common physical cell identifier.

As shown in FIG. 7A, and by reference number 705, a connection between user equipment 205 and correct source base station 210-1 is terminated. Correct source base station 210-1, incorrect source base station 210-2, and target base station 210-3 are base stations 210 within a proximity of user equipment 205. Correct source base station 210-1 and incorrect source base station 210-2 are associated with the same PCI, "AAA." As shown by reference number 710, target base station 210-3 receives, from user equipment 205, an RRC connection reestablishment request 715 that identifies the PCI, "AAA," common to both correct source base station 210-1 and incorrect source base station 210-2. As shown by reference number 720, target base station 210-3 selects correct source base station 210-1 for requesting a UE context based on information 725 stored in a data structure indicating that correct source base station 210-1 is associated with the greatest quantity of requests for RRC connections (e.g., indicating that correct source base station 210-1 may be undergoing a failure). Target base station 210-3 may obtain information 725 based on tracking RRC connection reestablishment requests, receiving information 725 from a control device of network 240, or the like.

As shown in FIG. 7B, and by reference number 730, target base station 210-3 requests the UE context from correct source base station 210-1. As shown by reference number 735, target base station 210-3 receives the UE context from correct source base station 210-1. As shown by reference number 740, target base station 210-3 establishes an RRC connection 745 with user equipment 205. In another example, target base station 210-3 may request the UE context from multiple potential source base stations 210 associated with multiple corresponding GCIs.

As indicated above, FIGS. 7A and 7B are provided merely as an example. Other examples are possible and may differ from what was described with regard to FIGS. 7A and 7B.

In this way, when target base station 210 receives a request for an RRC connection from user equipment 205, target base station 210 may locate a base station from which to obtain a UE context for user equipment 205, thereby facilitating establishment of the RRC connection with user equipment 205.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

To the extent the aforementioned embodiments collect, store, or employ personal information provided by individuals, it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "group" and "set" are intended to include one or more items (e.g., related items, unrelated items, a combination of related items and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
one or more processors to:
receive a radio resource control (RRC) connection reestablishment request,
the RRC connection reestablishment request including a first identifier that identifies one or more potential source base stations;
receive a second identifier that identifies a particular base station of the one or more potential source base stations;
determine a success rate for requesting a user equipment (UE) context using one or more identification techniques associated with locating the UE context;
select an identification technique, of the one or more identification techniques, associated with a UE, based on the success rate satisfying a threshold,
the identification technique comprising utilizing the second identifier;
select the particular base station, from which to request the UE context, based on the RRC connection reestablishment request and the identification technique;
request the UE context from the particular base station;
obtain the UE context from the particular base station based on requesting the UE context; and
establish an RRC connection with the UE using the UE context.

2. The device of claim 1, where the first identifier is:
a physical cell identifier associated with the particular base station.

3. The device of claim 1, where the threshold is a first threshold;
where the one or more processors are further to:
determine a connection metric with the particular base station; and
determine that the connection metric associated with the particular base station satisfies a second threshold; and
where the one or more processors, when selecting the particular base station, are to:
select the particular base station based on determining that the connection metric associated with the particular base station satisfies the second threshold.

4. The device of claim 1, where the one or more processors are further to:
select a set of potential source base stations using a particular identification technique,
the particular identification technique being different from the identification technique;
request the UE context from the set of potential source base stations; and
fail to receive the UE context based on requesting the UE context from the set of potential source base stations; and
where the one or more processors, when selecting the particular base station, are to:

select the particular base station based on failing to receive the UE context from the set of potential source base stations.

5. The device of claim 1, where the one or more processors are further to:
remove the particular base station from the one or more potential source base stations based on a particular identification technique,
the particular identification technique being different from the identification technique; and
where the one or more processors, when requesting the UE context, are further to:
request the UE context from the particular base station after removing the particular base station from the one or more potential source base stations.

6. The device of claim 1, where the second identifier is at least one of:
a global cell identifier associated with the particular base station,
a frequency identifier that identifies a frequency at which the particular base station operates, or
a bandwidth identifier that identifies a bandwidth at which the particular base station operates.

7. A non-transitory computer-readable medium storing instructions, the instructions comprising:
one or more instructions that, when executed by one or more processors, cause the one or more processors to:
receive a radio resource control (RRC) connection reestablishment request,
the RRC connection reestablishment request including a first identifier that identifies one or more potential source base stations;
receive a second identifier that identifies a particular base station of the one or more potential source base stations;
determine a success rate for requesting a user equipment (UE) context using one or more identification techniques associated with locating the UE context;
select an identification technique, of the one or more identification techniques, associated with a UE, based on the success rate satisfying a threshold,
the identification technique comprising utilizing the second identifier;
select the particular base station, from which to request the UE context, based on the RRC connection reestablishment request and the identification technique;
request the UE context from the particular base station;
obtain the UE context from the particular base station based on requesting the UE context; and
establish an RRC connection with the UE using the UE context.

8. The non-transitory computer-readable medium of claim 7, where the first identifier is:
a physical cell identifier associated with the particular base station.

9. The non-transitory computer-readable medium of claim 7, where the threshold is a first threshold;
where the one or more instructions, when executed by the one or more processors, further cause the one or more processors to:
determine a quantity of RRC connection reestablishment requests associated with the particular base station; and
determine that the quantity of RRC connection reestablishment requests associated with the particular base station satisfies a second threshold; and where the one or more instructions, that cause the one or more processors to select the particular base station, cause the one or more processors to:
select the particular base station based on determining that the quantity of RRC connection reestablishment requests associated with the particular base station satisfies the second threshold.

10. The non-transitory computer-readable medium of claim 7, where the one or more instructions, when executed by the one or more processors, further cause the one or more processors to:
select a set of base stations using a particular identification technique,
the particular identification technique being different from the identification technique;
request the UE context from the set of base stations; and
fail to receive the UE context based on requesting the UE context from the set of base stations; and
where the one or more instructions, that cause the one or more processors to select the particular base station, cause the one or more processors to:
select the particular base station based on failing to receive the UE context from the set of base stations.

11. The non-transitory computer-readable medium of claim 7, where the one or more instructions, when executed by the one or more processors, further cause the one or more processors to:
remove one or more base stations from the one or more potential source base stations based on a particular identification technique,
the particular identification technique being different from the identification technique; and
where the one or more instructions, that cause the one or more processors to request the UE context, cause the one or more processors to:
request the UE context from the particular base station after removing the particular base station from the one or more potential source base stations.

12. The non-transitory computer-readable medium of claim 7, where the second identifier is at least one of:
a global cell identifier associated with the particular base station,
a frequency identifier that identifies a frequency at which the particular base station operates, or
a bandwidth identifier that identifies a bandwidth at which the particular base station operates.

13. A method, comprising:
receiving, by a device, a radio resource control (RRC) connection reestablishment request,
the RRC connection reestablishment request including a first identifier that identifies one or more potential source base stations;
receiving, by the device, a second identifier that identifies a particular base station of the one or more potential source base stations;
determining, by the device, a success rate for requesting a user equipment (UE) context using one or more identification techniques associated with locating the UE context;
selecting, by the device, an identification technique, of the one or more identification techniques, associated with a UE, based on the success rate satisfying a threshold,
the identification technique comprising utilizing the second identifier;

selecting, by the device, the particular base station, from which to request the UE context, based on the RRC connection reestablishment request and the identification technique;

requesting, by the device, the UE context from the particular base station;

obtaining, by the device, the UE context from the particular base station based on requesting the UE context; and establishing, by the device, the RRC connection with the UE using the UE context.

14. The method of claim 13, where the first identifier is:
a physical cell identifier associated with the particular base station.

15. The method of claim 13, where the threshold is a first threshold;
where the method further comprises:
   determining a quantity of RRC connection reestablishment requests associated with the particular base station; and
   determining that the quantity of RRC connection reestablishment requests associated with the particular base station satisfies a second threshold; and
where selecting the particular base station comprises:
   selecting the particular base station based on determining that the quantity of RRC connection reestablishment requests associated with the particular base station satisfies the second threshold.

16. The method of claim 13, further comprising:
determining that a mobility level associated with the UE corresponds to a particular mobility level; and
identifying a set of base stations that have been visited by the UE based on determining that the mobility level associated with the UE corresponds to the particular mobility level; and
where selecting the particular base station comprises:
   selecting the particular base station based on identifying the set of base stations that have been visited by the UE.

17. The method of claim 13, where the second identifier is at least one of:
a global cell identifier associated with the particular base station,
a frequency identifier that identifies a frequency at which the particular base station operates, or
a bandwidth identifier that identifies a bandwidth at which the particular base station operates.

18. The method of claim 13, further comprising:
selecting the identification technique based on an effectiveness metric,
   the effectiveness metric being based on a success rate for requesting the UE context.

19. The method of claim 13, where the identification technique is a first identification technique; and
where the method further comprises:
   selecting a second identification technique based on a request for the UE context failing.

20. The method of claim 19, further comprising:
utilizing information of the UE context to maintain LTE services.

* * * * *